United States Patent [19]

Sullivan et al.

[11] Patent Number: 5,309,365
[45] Date of Patent: May 3, 1994

[54] SYSTEM FOR CUTTING ARTIFICIAL NAIL TIPS AND FOR DECORATING THE SAME OR EXISTING NAILS USING AUTOMATED CUTTING PROCESSES

[75] Inventors: Daniel J. Sullivan, Hartford; Janine R. Sadoski, Vernon, both of Conn.

[73] Assignee: Gerber Scientific Products, Inc., Manchester, Conn.

[21] Appl. No.: 908,304

[22] Filed: Jul. 2, 1992

[51] Int. Cl.$^5$ .............................................. G06F 15/46
[52] U.S. Cl. ........................... 364/474.03; 364/474.37; 132/75.4
[58] Field of Search ............... 364/474.03, 474.05, 364/474.37; 132/73, 75.4; 382/8, 60; 356/376

[56] References Cited

U.S. PATENT DOCUMENTS

| | | | |
|---|---|---|---|
| 3,786,821 | 1/1974 | Noskin | 132/88.5 |
| 3,875,950 | 4/1975 | Gens | 132/88.5 |
| 4,007,748 | 2/1977 | Matranga et al. | 132/73 |
| 4,132,234 | 1/1979 | Bradley | 132/73 |
| 4,135,526 | 1/1979 | Matranga et al. | 132/73 |
| 4,222,399 | 8/1980 | Ionescu | 132/73 |
| 4,229,431 | 10/1980 | Lee, Jr. et al. | 424/61 |
| 4,287,899 | 9/1981 | Robichaud | 132/73 |
| 4,361,160 | 11/1982 | Bryce | 132/73 |
| 4,436,684 | 3/1984 | White | 264/138 |
| 4,450,848 | 5/1984 | Ferrigno | 132/73 |
| 4,575,805 | 3/1986 | Moermann et al. | 364/474.03 |
| 4,605,024 | 8/1986 | Tremblay | 132/88.5 |
| 4,611,288 | 9/1986 | Duret et al. | 364/474.05 |
| 4,625,740 | 12/1986 | Roth | 132/73 |
| 4,626,428 | 12/1986 | Weisberg et al. | 424/61 |
| 4,627,453 | 12/1986 | Isler | 132/73 |
| 4,632,134 | 12/1986 | Reid | 132/73 |
| 4,648,416 | 3/1987 | Kilman et al. | 132/88.7 |
| 4,661,187 | 4/1987 | Beasley | 156/242 |
| 4,665,492 | 5/1987 | Masters | 364/468 |
| 4,669,491 | 6/1987 | Weisberg et al. | 132/73 |
| 4,671,305 | 6/1987 | Mann | 132/73 |
| 4,702,652 | 10/1987 | Rokksku et al. | 409/84 |
| 4,718,957 | 1/1988 | Sensenbrenner | 156/152 |
| 4,742,464 | 5/1988 | Duret et al. | 364/474.03 |
| 4,751,935 | 6/1988 | Mast et al. | 132/88.5 |
| 4,765,350 | 8/1988 | Moore | 132/88.5 |
| 4,767,648 | 8/1988 | Hokama et al. | 428/15 |
| 4,779,632 | 10/1988 | Howa et al. | 132/200 |
| 4,844,102 | 7/1989 | Repensek et al. | 132/73 |
| 4,876,121 | 10/1989 | Cohen | 428/15 |
| 4,898,192 | 2/1990 | Cohen | 132/73 |
| 4,924,889 | 5/1990 | Schaeffer et al. | 132/73 |
| 4,926,890 | 5/1990 | Hoskins | 132/73 |
| 4,954,190 | 9/1990 | Taeckens | 156/61 |
| 4,974,610 | 12/1990 | Orsini | 132/73 |
| 5,019,993 | 5/1991 | Montalcini et al. | 364/474.29 |

Primary Examiner—Jerry Smith
Assistant Examiner—Paul Gordon
Attorney, Agent, or Firm—McCormick, Paulding & Huber

[57] ABSTRACT

A system uses information taken from a sensing device sensing the dimensions of an existing fingernail structure and inputs this sensed information into a controller in machine usable form. The data is used by the controller to drive a variety of peripheral devices to cut a desired nail pattern in a material so that at least a part of the material snugly fits over the existing nail structure. The system is further capable of cutting a sheet of decorative material to the shape of a natural nail or one that is artificially placed on a nail. The decorative sheet may be formed of vinyl or mylar and has an adhesive layer which binds it to the involved nail.

32 Claims, 3 Drawing Sheets

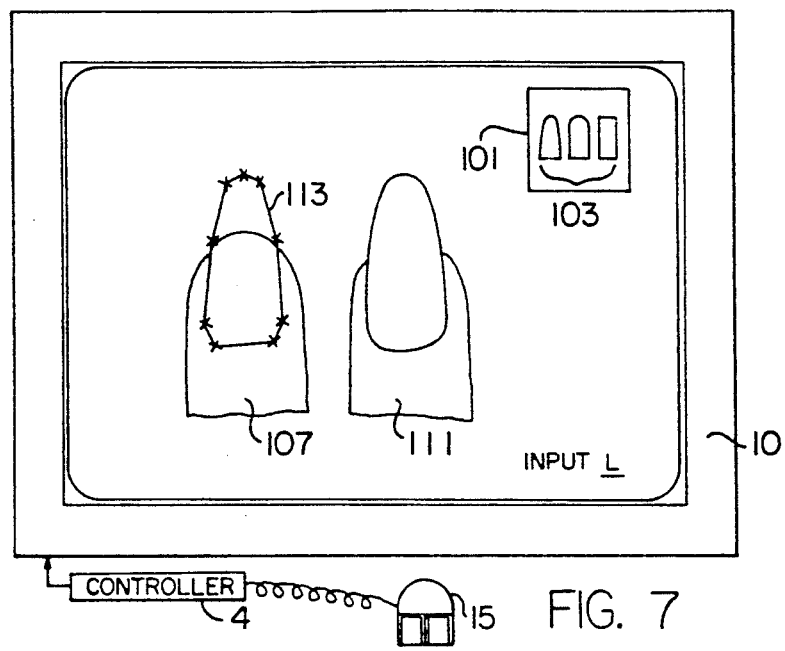
FIG. 7
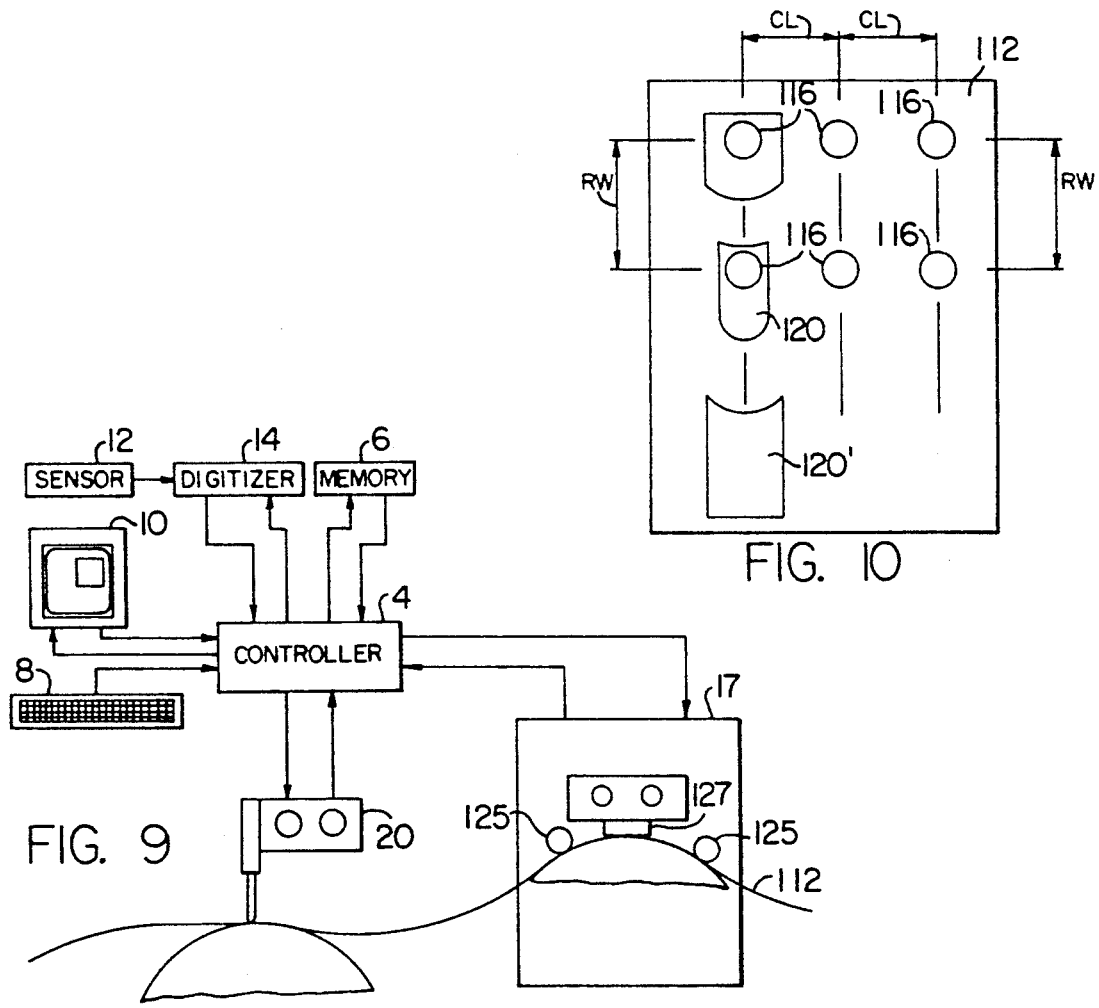
FIG. 10
FIG. 9

SYSTEM FOR CUTTING ARTIFICIAL NAIL TIPS AND FOR DECORATING THE SAME OR EXISTING NAILS USING AUTOMATED CUTTING PROCESSES

This application relates to creating artificial fingernail tips of the type which can be readily applied to existing natural fingernails, and relates more particularly to a method and related apparatus for custom fitting and shaping of artificial fingernail tips from blanks which are cut to fit the particular size and configuration of the finger of the user, and further relates to a method and related article for simplifying the decoration of the applied blanks or existing natural nails.

Artificial fingernail tips applied to the existing fingernails are well known. Often blanks are used which very generally fit the surface of the existing nail. One such known artificial fingernail tip is disclosed in Mann, U.S. Pat. No. 4,671,305, issued on Jun. 9, 1987. In this patent a discussion as to prior techniques in bonding a synthetic nail to a natural nail is made. In particular, the problems associated with two commonly known techniques of affixing artificial nails to existing underlying fingernails are discussed. One such process is called "nail sculpturing" wherein an adhesive is laid down over the existing nail from the cuticle to its tip and an artificial nail is subsequently applied onto this medium and becomes bonded to it once the adhesive dries. Subsequently, the artificial nail is extensively manually filed, thereby gaining the name of "nail sculpting". The practice of extensive abrasive filing to create a desired shape on an individual's hand is both labor intensive and time consuming. The second procedure for fitting artificial nail tips to the natural nail is called "nail wrapping". In this procedure, a fabric piece is cut and glued to the artificial nail tip and to the natural nail. The artificial nail does not extend to the cuticle, but rather is spaced from it resulting in a step being formed between the natural nail and the artificial nail tip. Coats of filler are applied between the cuticle and the step to aid in the connection and to blend away the step. Application of the filler exposes the user to fumes and liquids which can present health and respiratory problems. Once the connection is made, again, extensive abrasive and filing is effected to create a uniform, continuous look between the natural surface and the one presented by the artificial tip. This process is also highly labor intensive and leaves undesirable debris resulting from the filing process. Additionally, the artificial fingertip nails once applied, require decorating by painting the outer surface. This painting of the nails with polish also exposes the user to fumes and liquids which can present health and respiratory problems.

The general object of this invention is therefore to provide an apparatus and method for creating custom crafted artificial fingernail tips by using an automated system which automatically cuts a blank to size and shape to fit the configuration of the wearer's fingernail bed prior to its application to the natural nail surface.

A further object of the invention is to provide a system whereby the previous practice of initially using an adhesive filler applied between the artificial nail and the cuticle can be eliminated along with the health hazards associated with its use.

It is yet a further object of the present invention to provide a means for decorating a natural nail, or an artificial nail bonded to it, by using a thin sheet of self adhesive or otherwise adhered material or film applied in layer form over the natural or artificial nail surface.

Further objects and advantages of the invention will become apparent from the following specification and the appended claims.

SUMMARY OF THE INVENTION

The invention resides in a system for automatically cutting a material to be applied to an existing nail structure having a surface such that at least a portion of the material when cut is given a desired shape to fit the contour of at least a portion of the nail surface. The system comprises a sensing means for sensing the shape of the existing nail structure having a surface onto which surface cut material is to be applied. The sensing means includes a first means for determining the outline of the shape of the existing nail structure surface and a second means for determining the arcuate configuration of the existing nail structure surface. Means are provided for converting data derived from the sensing means into machine usable data and for for shaping the material by cutting it using the machine usable data. Control means receives the machine usable data and uses the data to drive the cutting means to effect cutting of the material along at least one portion of the material to give the at least one portion a desired shape as determined by information provided by the sensing means.

In one mode of the invention, the system is employed to automatically cut an artificial nail blank to be bonded to the natural nail of a person. The one portion of the blank corresponds to the portion of the material which will fit the shape of the cuticle and overlie the existing natural nail. The control means further includes means for selecting a desired sculpted shape for another portion of the blank to be applied to the existing nail surface, which another portion corresponds to the part of the blank not overlaying the natural nail.

In another mode of the invention, the material is a sheet of decorative material and the system further includes a web cutter. The decorative material may cover existing nail structure comprised of a natural nail alone or one that includes an artificial nail bonded to it. One portion of the material is cut so as to correspond at least to the shape of the cuticle of the existing nail structure. The control means further includes means for selecting a desired shape for another portion of the material to be applied to the remaining nail surface.

BRIEF DESCRIPTION OF THE PREFERRED EMBODIMENT

FIG. 2b is a partially fragmentary top plan view of the finger centering mechanism used in the tracer of FIG. 2a.

FIG. 7 shows a viewing screen of the system of FIG. 1 illustrating various different ways offered by the system to the user to sculpt a nail tip.

FIG. 9 is a schematic view showing the system of FIG. 1 in an alternative mode wherein a printing device prints directly on a sheet of decorative material and is subsequently cut by a automated cutter.

FIG. 10 is a top plan view showing a segment of a decorative sheet having graphics imprinted on it having been partially cut by a cutting machine.

DETAILED DESCRIPTION OF THE PREFERRED EMBODIMENT

Figure 1:
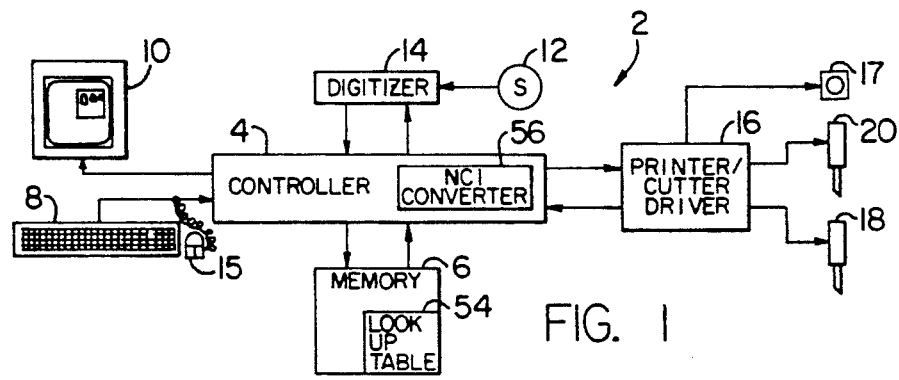
FIG. 1 shows schematically the system of the present invention.

Referring first to FIG. 1, a system 2 comprises a controller 4 having a memory 6, an input device 8 in the form of a keyboard and a mouse 15, an output viewing screen 10, a sensing means 12 and associated digitizer 14 connected to the controller 4 for inputting data describing the shape and configuration of a nail surface to which an artificial nail or decorative layer is to be applied. The controller 4 is linked to a printer/cutter driver 16 for controlling a plurality of peripheral devices, such as a thermal printer 17, and cutting tools 18 and 20.

Figure 2A:
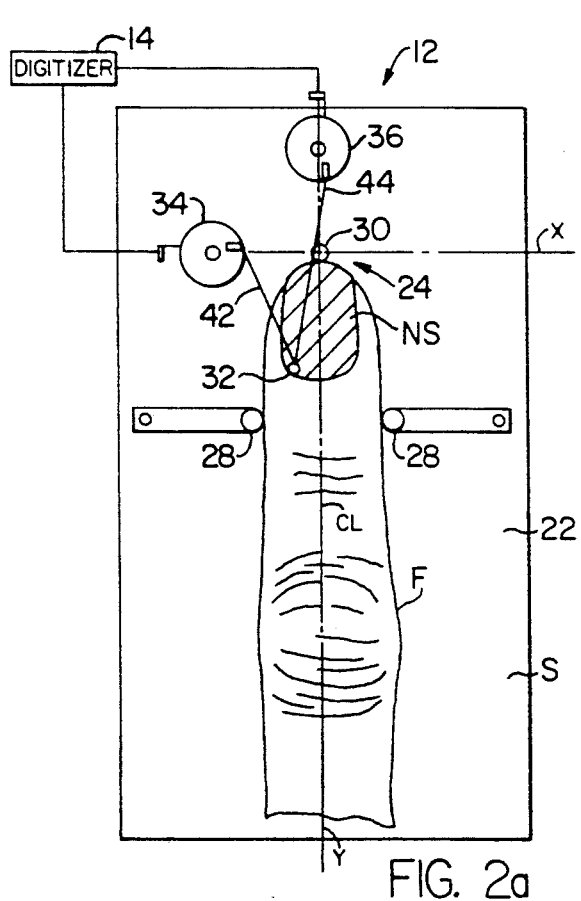
FIG. 2a is a top plan view of a tracer digitizer capable of being used in the present invention.
Figure 2B:
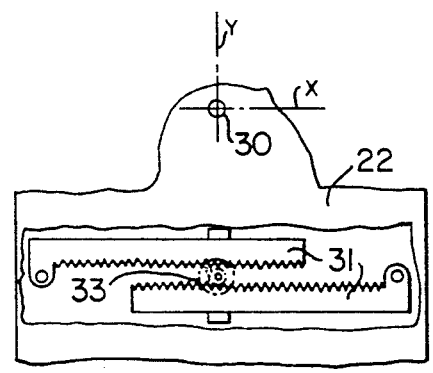
Figure 3:
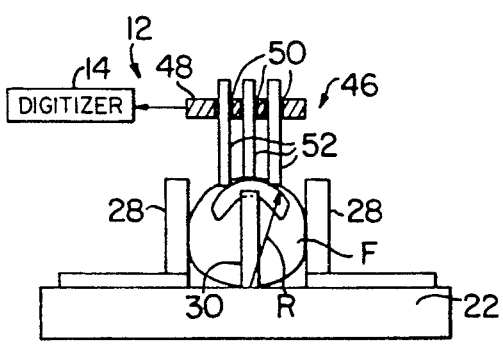
FIG. 3 is a front elevation view showing schematically a finger mounted in the apparatus of FIG. 2 looking at it from its front end.

Referring to FIGS. 2a, 2b, and 3, and in particular to the sensing means 12, it should be seen that the device 12 includes a mounting plate 22 having a support surface S and having registration means 24 for centering the finger F coincident with a centerline CL from which an actual shape is referenced. For this purpose, the means 24 includes a stationary pin 30 located coincident with the centerline CL and at the intersection of the X and Y coordinate axes, and further includes two moveable centering pins 28,28 that are so connected with one another below the support surface S that movement of either pin toward or away from the centerline CL automatically moves the other pin in the same amount. To this end, as shown in FIG. 2b, each of the pins 28,28 rides on a rack 31,31 coengaged with a freely rotatable pinion 33 secured to the plate 22 for restricting movement of the racks 31,31 relative to one another. In this way automatic centering of the finger with the centerline CL is achieved.

The sensing means 12 further includes a probe 32 connected to an X-transducer 34 and a Y-transducer 36 with each of the X and Y-transducers being respectively connected to an encoder/counter, the output pulses of which are inputted into the digitizer 14 for the purpose of tracing the outline of the natural surface NS and converting this data into numeric format. The probe 32 is connected to each transducer 34 and 36 respectively through the intermediary of an X-line 42 and a Y-line 44 each of which lines being wrapped around associated recoiling drums in each of the transducers so that as the probe is caused to trace the outline of the natural or artificial nail of the finger F, the nail outline is recorded relative to the origin 30 as the lines 42 and 44 respectively pay out and recoil from the transducers 34 and 36. As such, the finger tip, once abutting the stationary pin 30, is automatically centered with the centerline CL, and is traced in two dimensions relative to a known reference point.

As shown in FIG. 3, a Z-axis probe 46 is provided for determining the radius of curvature R of the natural nail in question. The probe 46 in the illustrative embodiment includes a bracket 48 in which at least two transducers 50,50 are housed and are adapted for slidingly receiving a corresponding number of elongate probes 52,52 therein. The probes are displaced relative to the mounting plate 48 in accordance with the amount of curvature that is particular to the natural nail surface when the probes are applied against it. The Z-axis encoder is also connected to the digitizer 14 for the purpose of converting the sensed information into digital format. Once inputted into the controller 4, the digitized data is then used by an appropriate program to calculate of the radius R given that the distances between the probes 52,52 are known. Each of the nail tip blanks used has a given radius of curvature and the radius of the blank selected must match the radius determined by the Z axis probe 46 for the involved finger. Thus, once this radius is determined, the system may display the calculated radius R on the display screen 10 for reference by the user in selecting the appropriate blank type. Alternatively, the curvature of the involved natural nail can be measured with a mechanical gauge and subsequently manually entered into the controller 4 for future use.

Figure 4:
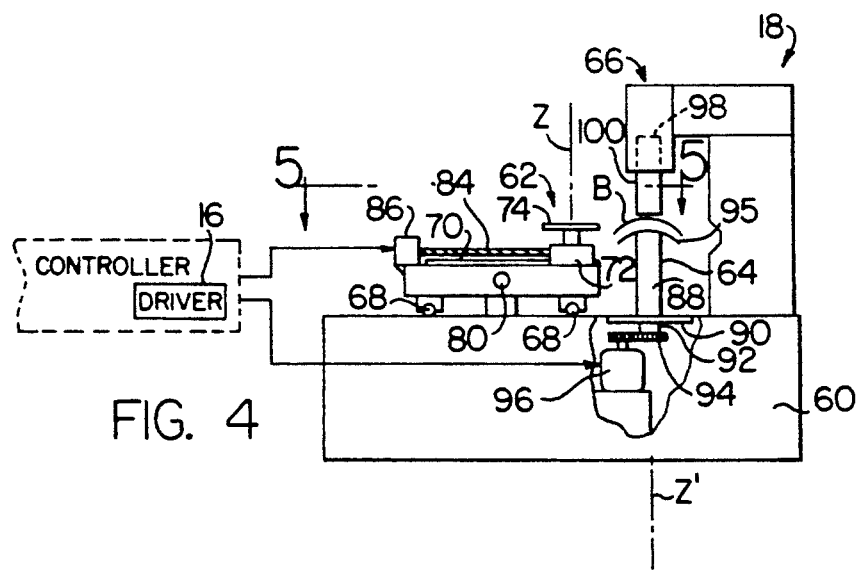
FIG. 4 is a front elevation view showing the nail edging apparatus with a nail blank supported during a cutting operation.
Figure 5:
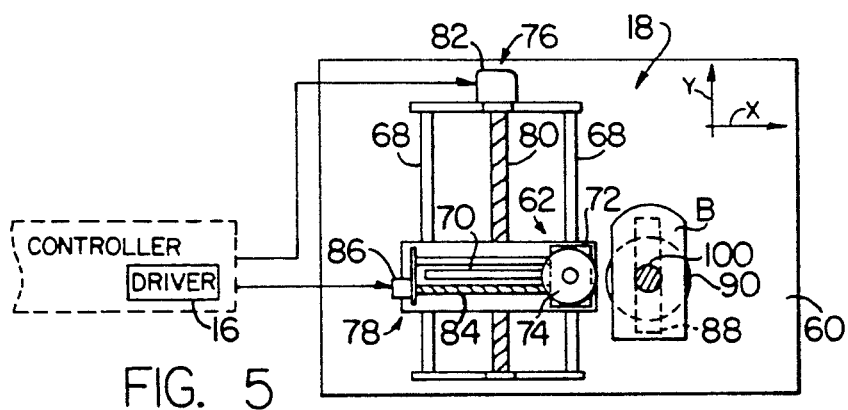
FIG. 5 is a generally top plan of the edging apparatus taken along line 5—5 of FIG. 4.

The controller 4 is capable of driving each of the cutter implements 18 and 20 and printing apparatus 17 in a manner known in the art. For this purpose, the controller 4 includes a peripheral device driver 16 and a numeric control information converter 56 which takes the data digitized at 14 and converts it into a form useable by the driver 16 to control the peripheral devices, 17, 18 and 20. As will hereinafter become apparent, the system 2, is capable of several modes of operation wherein the peripheral devices are run separately, or operated in cooperation with one another. In one such mode of operation, the controller 4 drives the milling tool 18 shown more particularly in FIGS. 4 and 5 to cause a blank B to be cut in conformance with control data derived from the sensing means 12.

The milling tool 18 is comprised of a base 60, a cutting means 62 selectively positionable on the base 60, a holder 64 rotatably mounted to the base 60 and positional relative to the cutting means 62 and a clamping member 66 cooperating with the holder 64 to clamp the blank B against movement on the holder 64. The cutting means 62 is capable of being controllably positioned both along the indicated X and Y-coordinate axes. For this purpose, the means 62 includes two Y-coordinate ways 68,68 fixed to the base 60 and extending parallel to the indicated Y-coordinate axis. The means further includes an X-coordinate way 70, which is cooperatively sized and shaped to slide along the Y-ways 68,68 and includes a means for receiving an X-carriage 72 which is slidable relative to the X-way for movement toward and away from the blank B. The carriage 72 carries a drive motor (not shown) drivingly connected to a rotating milling tool 74 for rotation about a Z axis extending orthogonally both to the X and Y-coordinate axes. The milling tool 74 is controllably positioned along each of the X and Y-coordinate axes by a Y-positioning means 76 and an X-positioning means 78 respectively associated with each of the Y-ways 68,68 and the X-way 70. The Y-positioning means 76 includes a lead screw 80 threadily connected to the X-way 70 and at one end thereof to a Y-servo-motor 82 for drivingly rotating the lead screw 80 and for positioning the Y-beam 70 along the indicated Y-coordinate axis. The X-positioning system 78 likewise includes a lead screw 84 threadily received within the X-carriage 72 and drivingly rotated at one end thereof by an X-servo-motor 86.

The blank B is capable of being rotated in at least 180 degrees in either rotational direction to allow the entire blank periphery to be engaged by the cutting tool 74. To this end, the holder 64 is journalled in the base 60 for rotation about an axis Z' extending parallel to that of the axis Z. The holder is a generally rectangular member having a body 88 which extends lengthwise about an inch to an inch and a half and is connected at its base to a circular footing 90 journalled in the base 60 of the machine 18. Below the footing 90 is a stem 92 about which is fixed a circular gear 94 which is engaged by a pinion drive 96 driven by an appropriate servo-motor for rotating the holder 64 about the axis Z'. The blank B is clamped against the holder 64 on a somewhat yieldable arcuate support 95 which underlies and generally conforms to the blank B. The clamp 66 includes a means 98 for acting against the blank B to compress it against the arcuate support 95. This means may take many different forms, but in the preferred embodiment it is a pneumatically actuated sliding cylinder which is driven against the upper surface of the blank B to hold it immovable on the support 95. The cylinder at 100 includes a swivel connection which permits downward force to be transmitted to the blank while nevertheless permitting relative rotation between the support 64 and the part of the cylinder which is connected to the clamping structure 66.

Figures 6A, 6B:
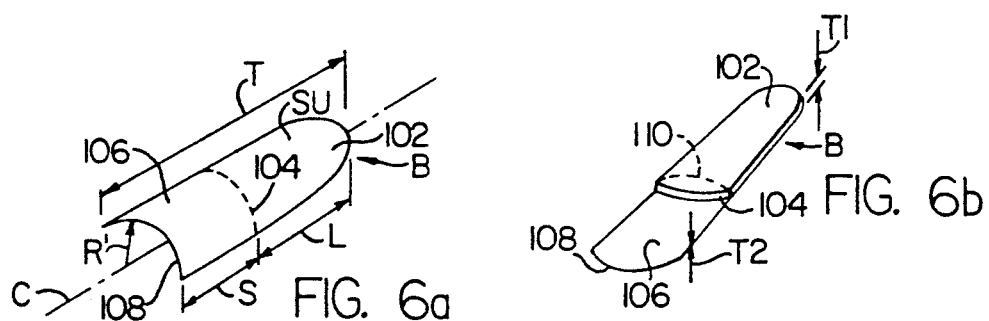
FIG. 6a and 6b are perspective views illustrating top and bottom views of an artificial fingernail tip blank.

In FIGS. 6a and 6b a blank in accordance with the invention is shown. The blank B has a continuous upper surface SU and is one formed preferably by injection molding of known materials, such as acrylic, nylon or polycarbonate, presently used to create artificial fingernail tips. The blank has a total length T and is comprised of a tip portion 102 having an associated length L and a shield portion 106 having an associated length S which lengths S and L combine to make up the total length T. The tip portion 102 has a thickness T1 which is markedly greater than the thickness T2 of the shield portion 106 such that a shoulder 104 extends generally transversely across the blank midway of its length and marks the transition between the two thicknesses. Each blank has a given length T defined by the combined dimensions S and L and has a line of symmetry C from which a radius of curvature R' for the blank is defined. The dimension S has a minimum length so as to present an area sufficient to overlay a natural nail beginning at the cuticle and ending at its tip. The shield portion is cut to size in accordance with data obtained by the tracing means 12. That is, the cross-hatched area shown in FIG. 2a represents the area which will ultimately be covered by the shield portion 106 of the blank B. The blank B is accurately cut by the machine 18 such that the shield portion 106 of the blank B snugly fits over the natural nail and the shoulder 104 abuts the leading edge of the existing nail while the leading edge 108 of the shield contacts the cuticle of the finger.

Shaping of the tip portion 102 is also accomplished by the milling tool 18 simultaneously with the cutting of the shield portion 106. For this, as shown in FIG. 7, the system through the intermediary of the display screen 10 and appropriate known software, provides the user the option of selecting different nail sizes and shapes 103, i.e. rounded, oval, squared, which are stored in memory and presented on a separate window 101 on the screen. The desired length L of the tip portion 102 of one nail is inputted as a parameter in this shaping process along with the finger designation, i.e. first finger, second or thumb, for the length inputted. Based on this inputted information, controlling software utilizes a scaling algorithm which takes the inputted length value for the nail selected and scales the remaining nail shapes proportionally sizewise. The user highlights and moves the selected tip shape onto a portrayal of the unfinished finger 107 to show how it would appear on the finished finger 111. Alternatively, the user may create the nail by drawing it directly onto the screen using the mouse to place the cursor X along lines 113, 113 representing an outline of the nail shape desired. This process can be subsequently aided by known systems which take the rough outline made by the lines 113, 113 and translates them into a usable form.

Figure 8:
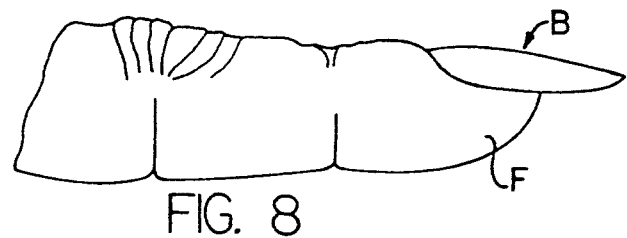
FIG. 8 shows the tip of FIGS. 6a and 6b as applied to a natural fingernail of a user.

As seen in FIG. 6b, the shoulder 104 can also be milled by the tool 18 to have a desired curvature to follow the tip of the natural nail as indicated by the dotted line at 110. For this purpose, the carriage 72 may also include a Z-axis positioning device allowing the cutting tool 74 to be controllably positioned along the Z-axis to cut a path 110 along the shoulder 104. The Z-axis positioning feature is necessary for cutting along the curvature of the radius R' of the blank B. The cut blank can now be readily affixed to a nail surface by such known adhesives as nail glue, one such type may be cyano acrylate. The selected adhesive may be treated with an antifungal chemical to inhibit growth of nail mold once the blank is bonded to the natural nail. As a result of this process, as best shown in FIG. 8, the cut nail blank blends evenly both with the existing nail and the cuticle. It should nevertheless be understood that the blanks usable by the system 2 can also be ones that do not have shoulders, but rather have continuous uninterrupted surfaces upper and lower surfaces. In this latter case, milling along the Z-axis is unnecessary. Also, it should be understood that as the nail grows out, the space between the blank and the cuticle will need to be filled in with an artificial filler, but that through the intermediary of the shield portion 106, this space is significantly reduced from what it would otherwise have been if blanks using noncustom cut shields were used.

In FIGS. 9 and 10, the system according to FIG. 1 is employed, except that the controller 4 drives both the printer 17 and the cutter 20 in coordination with one another. The purpose of this arrangement is to create a decorative covering for the existing natural nail or one having an artificial tip attached to it. To this end, data digitized from the sensing means 12 and inputted to the controller 4 calculates a two dimensional nail surface area for the fingernail surface in question. This resultant two dimensional area is derived by using the determined values for the radius R and those values determined by the X-Y coordinate probe 32 for the fingertip surface in question. To aid in this calculation, the memory 6 may include a look-up table 54 which takes the calculated or inputted radius R, and uses it to map the otherwise three dimensional characteristics of the underlying nail profile into a two-dimensional area. In this mode, the probe 32 traces the existing nail structure, be it made up solely of a natural nail or one that has an artificial surface attached to it. In the case where the nail blank has already been cut and applied as shown in FIG. 8, the data used in the cutting operation is again used in calculating the surface area value.

A sheet of decorative material 112 is provided and is cut by the system such that custom cut sized portions of its length may be applied to a nail surface to achieve a desired decorative effect. The decorative sheet 112 may be one of a number of thin colored films, having a thickness of two to three mils, and being commercially available through Gerber Scientific Products, Inc. as disclosed in U.S. Pat. No. 4,467,525. As stated therein, the top layer is the layer ultimately applied to a surface and carries a thin film of adhesive, usually acrylic or rubber based, interposed between it and a carrier sheet having a release surface formed thereon. If desired, the decorative sheet 112 can, prior to or after cutting, have a graphic printed on it. This can be done through the intermediary of a known ink jet or thermal printing device, such as shown at 17, which deposits a colored pattern directly onto the decorative sheet 112 during the designing process. The decorative sheet 112 is colored, such as ruby red, and therefore, when applied to the underlying nail surface, has the same affect as coloring by painting. Additionally, the thin adhesive film may be treated with an antifungal chemical to inhibit the growth of nail mold once the existing nail structure is covered. The decorative sheet may be one formed from vinyl or acetate, but in the preferred environment it is made from Mylar or other polyester based mayerial.

In the embodiment shown in FIG. 9, printing and cutting occurs on a continuous length of the decorative sheet 112. The sheet 112 is maintained in registration with each of the machines 17 and 20 so that the placement of a graphic on the sheet 112 by the printer 17 can readily be located and cut around by the cutter 20. The cutter is one such as disclosed in aforementioned U.S. Pat. No. 4,467,525 and employs a blade which cuts through the decorative sheet, but only partial scores the underlying base sheet. The decorative sheet, for purposes of maintaining this registration, may have a plurality of holes punched along its side margins for receiving the outwardly extending pins of sprockets 125,125. As in the case with the cutter 20, the printer 17 has a print head 127 which is controllably positionable transversely to the direction of travel of the sheet material 112. In this way, a number of graphics can be printed on the decorative sheet 112 transversely of its length and subsequent cut by the cutter 20. The cutter cuts symmetrically about this graphic using the data derived from the calculation of the two dimensional area. The cut shape is simply peeled off the carrier sheet and applied to the involved nail surface.

As shown in FIG. 10, desired graphics 116,116 may be preprinted on the decorative sheet 112 in rows and columns and spaced uniformly, as shown by dimensions RW and CL, which spacings may readily be referenced by a marking indicia 118 placed on one of the rows RW to allow automatic referencing of other rows and columns from this one reference point. The indicia may be sensed by a means in the cutter to effect initialization of the cutter head relative to the graphics. Subsequently, cuts 120,120 outlining the shape of the nail surface to be covered can automatically be made by a cutting machine in a manner discussed previously. Alternatively, as shown in FIG. 10 at 120', the cut made in the decorative sheet 112 may be one that custom fits only the shape of the cuticle, but which provides a sufficient area to cover the existing nail surface, the excess of which material may be trimmed away after its application to the nail.

By the foregoing, a system for automatically cutting and shaping nail blanks to conform them to a desired configuration on a hand is disclosed. However, numerous uses, modifications and substitutions may be had without departing from the spirit of the invention. For example, while the sensing means is disclosed in the preferred embodiment as being one that employs a probe, it may readily be substituted for by any one of a number of electronic digitizing or electro-optical type scanning device which are capable of bit-maping images of the natural nail into memory and thereafter running an algorithm to determine vectorially the outline of the scanned nail surface. Additionally, while the decorative sheet 112 has been disclosed as having a series of punched holes extending along its marginal edges to locate them within drive sprockets in the cutter 20 and in the printer 17, the sheet may alternatively be frictionally driven through such a cutter to create the cut pattern while nevertheless maintaining positive registration between it and these machines. Also, the preferred embodiment discloses use in conjunction with fingernails, but it is clearly within the purview of the invention to use the system to cover toenails as well.

Accordingly, the invention has been described by way of illustration rather than limitation.

We claim:

1. A system for automatically cutting a material to be applied to an existing fingernail structure having a surface such that at least a portion of the material when cut is given a desired shape to fit the contour of at least a corresponding portion of the fingernail surface, said system comprising:

a sensing means for sensing the shape of an existing fingernail structure surface onto which surface cut material is to be applied, said sensing means including a first means for determining the outline of the shape of the existing fingernail structure surface and a second means for determining the arcuate configuration of the existing fingernail structure surface;

means for converting data derived from said sensing means into machine usable data;

means for shaping said material by edge cutting it using said machine usable data; and control means for receiving said machine usable data and using said data to drive said cutting means to effect cutting of the material along at least one portion of the material to give said at least one portion of the material a desired shape to fit the contour of a corresponding portion of the fingernail surface as determined by information provided by said sensing means.

2. A system as defined in claim 1 further characterized in that said sensing means includes a tracing means for converting the shape of said existing fingernail structure into digitized form.

3. A system as defined in claim 2 further characterized in that said tracing means includes an automatic locating means for locating and centering the involved finger onto which the material is to be applied along a central axis coincident with the location of one of two orthogonally oriented coordinate axes.

4. A system as defined in claim 3 further characterized in that said tracing means includes a probe connected to X and Y-transducers capable of tracking the displacement of the probe from a given origin and recording the displacement of said probe as it is moved along the outline of the existing fingernail structure.

5. A system as defined in claim 4 further characterized in that said sensing means further includes a means for sensing the radius of curvature of the involved existing fingernail structure, said means for sensing the radius of curvature having a bracket and at least two sliding probes spaced from one another; and said sliding probes each sensing the displacement of said existing fingernail along its radius of curvature.

6. A system as defined in claim 1 further characterized in that said existing fingernail structure is the natural fingernail of a person and said material is an artificial fingernail blank, said at least one portion of said material corresponds to the portion of the material which will fit the shape of the cuticle and overlie the existing natural fingernail, said control means further including means for selecting a desired sculpted shape for another portion of said material to be applied to said existing fingernail surface, which another portion corresponding to the part of the material not overlaying the natural fingernail.

7. A system as defined in claim 6 further characterized in that said control means is connected to a cutting machine to cut a desired shape into said blank; and wherein said cutting machine having a cutting tool moveable in at least two coordinate directions.

8. A system as defined in claim 7 further characterized in that said milling tool is capable of being moved in X, Y and Z-coordinate directions to effect shaping of a shoulder in the blank.

9. A system as defined in claim 7 further characterized in that said selection means includes a data input means and a viewing means each connected to said control means; and said data viewing means and input means allowing the user to project a desired fingernail shape onto an image of a finger of the user on said viewing screen as portrayed by said data derived from said sensing means.

10. A system as defined in claim 9 further characterized in that said cutting tool is capable of holding a blank having a tip portion corresponding to said another portion and a shield portion corresponding to said one portion each of which portions being integrally connected with one another; and wherein said cutting tool cuts the shield portion in conformance with data gathered by said sensing means and cuts said tip portion as a result of instructions given to it by said selection means.

11. A system as defined in claim 10 further characterized in that said cutter means includes means for clamping the blank on a holder against movement.

12. A system as defined in claim 1 further characterized in that said material is a sheet of decorative material and said system further includes a web cutter, said at least one portion of said material corresponds at least to the portion of the material which fits the shape of the cuticle of the existing fingernail structure, said control means further including means for selecting a desired shape for another portion of said material to be applied to said existing fingernail surface, said control means including means for utilizing said data obtained by said sensing means to cut a two-dimensional shape into a web corresponding in area to at least the surface of the existing fingernail structure to be covered.

13. A system as defined in claim 12 further characterized in that said sensing means includes means for sensing the radius of curvature of the existing fingernail structure and said controller includes a look-up means for correlating the two dimensional shape of the outline of said fingernail structure with said the radius of curvature to establish a given surface area;

said control means includes a memory means having a lock-up table for automatically deriving the given surface area from two coordinate direction parameters and said radius of curvature.

14. A system as defined in claim 13 further characterized in that said control means controls simultaneously a printer and a cutter for coordinated action; and wherein a continuous web of decorative sheet is fed between each of the cutter and printer to affect coordinated printing and cutting operations respectively on the decorative web.

15. A system as defined in claim 14 further characterized in that said printer is a thermal printer and prints a desired design inputted to it in digital form from a viewing screen.

16. A system as defined in claim 14 further characterized in that said printer is a colored ink jet printer.

17. A system as defined in claim 14 further characterized in that said cutter cuts a desired fingernail shape about the location where the desired graphic is printed on the sheet of decorative web.

18. A system as defined in claim 17 further characterized in that said sheet of decorative material includes a thin film of colored material having a tacky adhesive adhered to it; and wherein said thin colored film is carried by a base layer having a release surface formed on it and facing the adhesive coated side of the colored vinyl sheet.

19. A system as defined in claim 18 further characterized in that said thin film of colored material is formed from polyester based film.

20. A system as defined in claim 18 further characterized in that said thin film of colored material is formed from acetate.

21. A system as defined in claim 18 further characterized in that said thin film of colored material is formed from vinyl.

22. A system as defined in claim 12 further characterized in that said existing fingernail structure being a structure having a fingernail blank bonded to a natural fingernail and said at least one portion corresponds in area to the shape of the natural fingernail surface and said another portion corresponding to the part of the material not overlaying the natural fingernail.

23. A system as defined in claim 18 further characterized in that said tacky adhesive is treated with an antifungal chemical.

24. A system for automatically cutting an artificial fingernail blank to be applied to an existing natural fingernail surface such that the blank when cut has a desired shape to fit the specific dimensions of the existing natural fingernail surface and take on a desired sculpted shape, said system comprising:

a sensing means for sensing the shape of an existing fingernail surface onto which a blank is to be applied, said sensing means including a first means for determining the shape of the existing fingernail surface and a second means for determining the arcuate configuration of the existing natural fingernail surface;

means for converting data derived from said sensing means into machine usable data;

means for selecting a desired sculpted shape for one portion of said material to be applied to said existing fingernail surface, which one portion corresponding to the part of the material not overlaying the natural fingernail;

means for shaping said blank by cutting it using said machine usable data;

control means for receiving said machine usable data and using said data to drive a cutting tool to effect cutting of the blank along said one portion to give said one portion a desired shape as determined by information provided by said selecting means and to effect cutting of the blank along another portion corresponding to the sensed shape of the natural fingernail such that it is continuous with the one portion to custom fit the blank onto the existing fingernail surface.

25. A system as defined in claim 24 further characterized in that said blank is bonded to said existing natural fingernail by an adhesive is treated with an antifungal chemical.

26. A system for creating a decorative surface on a fingernail structure by applying a decorative sheet to the surface of the fingernail structure, said system comprising:

means for sensing the shape of an existing fingernail structure in three dimensions;

means for converting information sensed by said sensing means into machine usable data;

control means for using said data defining the shape of said fingernail structure in three dimensions and mapping a two dimensional surface area based on said data;

a cutting machine having means for receiving a sheet of decorative material; and means for driving said cutting machine with said control means using said data representing said mapped area to cut closed shapes into the decorative sheet material, each of which closed shapes having a given area relating to the surface area of the fingernail structure to be covered in response to the data sensed by the sensing means.

27. A system as defined in claim 26 further characterized in that said system further includes a printer having means for depositing on said decorative sheet a decorative graphic;

said printer and said cutter having registration means allowing a continuous segment of decorative material to be simultaneously received by each of said cutter and said printer, and wherein said cut closed shapes made in said sheet material surround the placement of the decorative graphic on the sheet material.

28. A system as defined in claim 27 further characterized by a data input means and a viewing means for displaying a desired graphic or pattern on the screen and printing on the decorative sheet the desired decorative graphic design or pattern.

29. A system as defined in claim 27 further characterized in that said control means uses said data derived from sensing means to cut a closed shape about a decorative graphic such that it is oriented symmetrically about the graphic.

30. A system as defined in claim 26 further characterized in that said decorative sheet has a graphic pre-printed on it and said control means uses said data to cut a closed shape symmetrically about the graphic.

31. A system for automatically cutting a material to be applied to an existing fingernail structure having a surface such that at least a portion of the material when cut is given a desired shape to fit the contour of at least a corresponding portion of the fingernail surface, said system comprising:

a sensing means for sensing the shape of an existing fingernail structure surface onto which surface cut material is to be applied, said sensing means including a first means for determining the outline of the shape of the existing fingernail structure surface and a second means for determining the arcuate configuration of the existing fingernail structure surface;

means for converting data derived from said sensing means into machine usable data;

means for shaping said material by cutting it using said machine usable data;

control means for receiving said machine usable data and using said data to drive said cutting means to effect cutting of the material along at least one portion of the material to give said at least one portion of the material a desired shape to fit the contour of a corresponding portion of the fingernail surface as determined by information provided by said sensing means;

said existing fingernail structure being a natural fingernail of a person and said material is an artificial fingernail blank, said at least one portion of said material corresponds to the portion of the material which will fit the shape of the cuticle and overlie the natural fingernail, said control means further including means for selecting a desired sculpted shape for another portion of said material to be applied to said existing fingernail surface, which another portion corresponding to the part of the material not overlaying the natural fingernail.

32. A system for automatically cutting a material to be applied to an existing fingernail structure having a surface such that at least a portion of the material when cut is given a desired shape to fit the contour of at least a corresponding portion of the fingernail surface, said system comprising:

a sensing means for sensing the shape of an existing fingernail structure surface onto which surface cut material is to be applied, said sensing means including a first means for determining the outline of the shape of the existing fingernail structure surface and a second means for determining the arcuate configuration of the existing fingernail structure surface;

means for converting data derived from said sensing means into machine usable data;

means for shaping said material by cutting it using said machine usable data;

control means for receiving said machine usable data and using said data to drive said shaping means to effect cutting of the material along at least one portion of the material to give said at least one portion of the material a desired shape to fit the contour of a corresponding portion of the fingernail surface as determined by information provided by said sensing means;

said material is a sheet of decorative material and said system further includes a web cutter, and said at least one portion of said material corresponds at least to the portion of the material which fits the shape of the cuticle of the existing fingernail structure, said control means further including means for selecting a desired shape for another portion of said material to be applied to said existing fingernail surface, said control means including means for utilizing said data obtained by said sensing means to cut a two-dimensional shape into a web corresponding in area to at least the surface of the existing fingernail structure to be covered.

* * * * *